United States Patent [19]

Grundmann

[11] Patent Number: 4,473,608
[45] Date of Patent: Sep. 25, 1984

[54] FIRE RETARDANT DAMPING MATERIALS BASED ON POLYVINYL CHLORIDE

[75] Inventor: Raban Grundmann, Marl, Fed. Rep. of Germany

[73] Assignee: Chemische Werke Huels, Marl, Fed. Rep. of Germany

[21] Appl. No.: 415,625

[22] Filed: Sep. 7, 1982

[30] Foreign Application Priority Data

Sep. 5, 1981 [DE] Fed. Rep. of Germany ....... 3135199

[51] Int. Cl.³ .............................................. B32B 5/16
[52] U.S. Cl. ........................................ 428/68; 428/71; 428/74; 428/76; 428/402; 428/407; 252/62; 156/71
[58] Field of Search ..................... 428/402, 68, 71, 74, 428/76, 407; 252/62; 521/56, 59, 60, 64

[56] References Cited

U.S. PATENT DOCUMENTS

| | | | |
|---|---|---|---|
| 3,057,831 | 9/1962 | Holdsworth | 428/402 |
| 3,382,198 | 5/1968 | Elslager | 428/402 |
| 3,446,693 | 5/1969 | Alig et al. | 428/315.5 |
| 3,785,913 | 1/1974 | Hallamore | 428/76 |
| 3,863,758 | 2/1975 | Connelly | 428/74 |
| 4,166,171 | 8/1979 | Mitchell | 528/488 |
| 4,324,831 | 4/1982 | Parrini et al. | 252/62 |

FOREIGN PATENT DOCUMENTS

| | | | |
|---|---|---|---|
| 923266 | 3/1973 | Canada | 428/402 |
| 0011416 | 5/1980 | European Pat. Off. | |
| 0040443 | 11/1981 | European Pat. Off. | |
| 2278472 | 2/1976 | France | 428/402 |
| 53-064276 | 6/1978 | Japan | |

OTHER PUBLICATIONS

Kunststoff-Handbuch, "Polyvinylchlorid", vol. 2 (1963) pp. 63–65.
Ullmanns Encyklopadie der Technischen Chemie, 4. e., vol. 20, p. 427–428.
"Ullmanns Encyklopadie der Technischen Chemie" (1956) 3rd Edition, vol. 7, p. 296.

*Primary Examiner*—William J. Van Balen
*Attorney, Agent, or Firm*—Millen & White

[57] ABSTRACT

New damping (insulating) materials are based on polyvinyl chloride particles or balled up fibers which are extremely lightweight and have a bulk density of 10–200 g/l and a particle weight less than 1 g. The particles are either enveloped by sheets or combined into lightweight components by means of heat or by the addition of binders, such as adhesives, fusion (hot-melt) adhesives, curable polymers, or frothed (pre-foamed), expandable polymers.

12 Claims, No Drawings

FIRE RETARDANT DAMPING MATERIALS BASED ON POLYVINYL CHLORIDE

BACKGROUND OF THE INVENTION

The preparation of foamed polyvinyl chloride molding compositions or sheets using chemical or physical blowing agents or using extruders under gas pressure is part of the state of the art (see, for example, "Kunststoff-Taschenbuch" [Plastics Pocketbook] 20th edition, Carl Hanser Verlag 1977, pp. 277, 349; or DOS No. 2,944,068, Shin Etsu Chem.). In general, closed-cell foam materials are produced having densities of 40–800 g/l. These polyvinyl chloride foam materials have not become popular as thermal insulating materials despite their inherent flame retardance, because their weight per unit volume is either too high, or their manufacture is too expensive due to the consumption of blowing agents and the use of costly processing.

The disadvantage of the known methods consists in that 1. only 2-step or 3-step-processes are applied,
2. one has to work under elevated pressure,
3. the molding times are extremly high. (Ullmanns Encyklopädie der technischen Chemie, 4. ed., vol 20, p. 427-14 28; JP No. 53 064 276; EP No. 00 40 443)

SUMMARY OF THE INVENTION

Accordingly, it is an object of this invention to provide flame-retardant damping materials based on polyvinyl chloride which are preparable using simple procedures and which materials have densities of <200 g/l.

Upon further study of the specification and appended claims, further objects and advantages of this invention will become apparent to those skilled in the art.

These objects have been attained by using as damping (insulation) materials, voluminous PVC particles having a particle weight of 1 g and a bulk density of 10–200 g/l. Certain preparative processes are preferred in this regard as discussed below.

DETAILED DISCUSSION

For example, voluminous polyvinyl chloride particles having a bulk density of 10–200 g/l can be produced by adding a solution of polyvinyl choride in a solvent to a heated, agitated nonsolvent for PVC, while removing the solvent by distillation, thereby precipitating PVC particles; the nonsolvent having a boiling point of <100° C. under normal pressure and the temperature of the nonsolvent lying 40–120° C. above the boiling point of the solvent, but not falling below 100° C. nor exceeding 180° C. Such a process is described in commonly assigned, commonly invented U.S. application Ser. No. 415,509 filed Sept. 7, 1982, whose disclosure is entirely incorporated by reference herein.

Homo- or copolymers of vinyl chloride can be employed as starting material for the preparation of the voluminous polyvinyl chloride particles. Comonomers, such as vinyl acetates, acrylates, vinyl ethers, acrylonitrile, maleic acid, fumaric acid esters, vinylidene chloride, propylene, ethylene can be contained in the polyvinyl chloride in amounts of up to 20 molar percent. Also, especially suitable for the process are postchlorinated PVC grades with chlorine contents of up to 65%.

The homo- and copolymers of vinyl chloride can be prepared by all conventional methods, for example by bulk polymerization, emulsion polymerization, suspension or microsuspension polymerization, and solution polymerization, as described in the monograph "Polyvinylchlorid und Vinylchlorid-Mischpolymerisate" [Polyvinyl Chloride and Vinyl Chloride Copolymers] by H. Kainer, Springer Publishers, Berlin/Heidelberg/New York (1965), whose disclosures are incorporated by reference herein, and which disclose bulk polymerization on pages 7–10, emulsion polymerization on pages 34–59, suspension polymerization on pages 12–34, and solution polymerization on pages 10–11.

The polymers are dissolved in suitable solvents which should have a boiling point below 160° C., preferably below 100° C., under normal pressure.

Examples of suitable solvents include ethers, such as tetrahydrofuran, dibutyl ether, dioxane etc.; esters, such as ethyl acetate, ethyl propionate, ethylene carbonate etc.; ketones, such as acetone, cyclohexanone, methyl ethyl ketone, methyl isobutyl ketone, 2-pentanone, 3-pentanone, cyclopentanone etc.; chlorinated hydrocarbons, such as methylene chloride, tetrachloroethane, carbon tetrachloride, dichloroethane, 1,1,1-trichloroethane etc.; aromatics, such as benzene, toluene etc.; or polar liquids, such as carbon disulfide etc.; used in the pure form (i.e. alone) or as mixtures. The solvents known in PVC fiber manufacture are preferred, for example tetrahydrofuran (THF), cyclohexanone, or mixtures, e.g. THF/butyl acetate, THF/methylene chloride, $CS_2$/acetone, $CS_2$/methylene chloride, or acetone/benzene.

The solutions should have concentrations of 1–25% by weight; preferably of 5 to 15% by weight, preferably in tetrahydrofuran.

Suitable nonsolvents include liquids which neither dissolve nor swell polyvinyl chloride and which have a boiling point of <100° C., preferably <120° C. under normal pressure. Good results are achieved with glycols, such as ethylene glycol, propylene glycol etc.; polyglycols, such as diethylene glycol, triethylene glycol etc.; polyhydric alcohols, such as glycerol etc.; alcohols, such as n-hexanol etc.; carboxylic acids, such as acetic acid or propionic acid etc.

It is also possible, with good results, to employ aqueous solutions of inorganic salts, such as, for example, of NaCl, $CaCl_2$, $KNO_3$, $MgSO_4$, Na acetate, etc., or aqueous solutions of organic additives, such as, for example, mixtures of glycol/water, glycerol/water etc.

The nonsolvent temperature is usually 100–180° C.; preferably, glycol is utilized at a temperature of 120–160° C. A characteristic feature of the process of the invention is that the temperature of the nonsolvent is, independently of the pressure selected, 40–120° C. and preferably 60–100° C. above the boiling point of the solvent.

The PVC precipitation can be effected in a great variety of different devices. Thus, the voluminous material is obtained most simply by dripping the PVC solution into the agitated, heated batch of nonsolvent, and removing the solvent by distillation and condensation. Especially favorable results regarding weight per unit volume are achieved by spraying the PVC solution through a single- or two-fluid nozzle under pressure or with propellant gas or propellant steam into the nonsolvent. Thus, the polymer solution is advantageously added in droplet form, as a thin jet, or as a mist.

By use of the fine droplets, a flakier material is obtained; by using a thin jet [stream], a more fibrous material results.

The nonsolvent is kept in agitation by customary agitating devices or by employment in the form of a running liquid film. The process can be conducted batchwise or continuously. The use of pressure or vacuum during precipitation is possible, but operation under normal pressure is preferred.

The thus-precipitated, voluminous polyvinyl chloride can be separated by filters, screening devices, or centrifuging. Residues of nonsolvent can be removed by washing with water. Drying is performed by blowing with air, vacuum drying, heating to 120° C., or by a combination of the aforementioned possibilities.

Suitable PVC particles for use in the invention can also be obtained by other precipitation processes of any kind, special polymerization processes, spray-drying, spinning, or by mechanical methods, such as shaving, rasping, turning, sawing, or grinding. Such particles are characterized by a bulk density of 10–200 g/l, preferably 20–80 g/l. They are present in the form of voluminous flakes or as balled-up fibers and exhibit the aforementioned low bulk density on account of the bulky, open-pore structure and the existing air occlusions.

The bulk densities herein were determined by filling the precipitation or other PVC product into a 1-liter upright cylinder (height 30 cm) without shaking or compacting, and subsequent weighing. The individual particles exhibit a weight of less than 1 g, preferably <0.1 g, the majority of the particles weigh from 100 to 0.01 mg, preferably 10–0.1 mg. In case of ground products, the maximum particle weight is below 10 mg, preferably below 1 mg. The plurality of particles weigh from 1 to 0.0001 mg, preferably 0.1–0.001 mg.

The production of damping, i.e. insulation materials according to this invention based on polyvinyl chloride is then effected. Using procedures which are conventional but especially adapted, where necessary, as indicated below, for this invention and using the voluminous polyvinyl chloride particles or balled-up fibers, e.g., manufactured as set forth above. Preferred damping material production processes include:

(1a) The simplest possibility is the preparation of foam materials under the action of heat. This effect can also be achieved using a hot-air stream or a steam jet, optionally under pressure. For this purpose, the particles can be filled into molds and softened on their surfaces by the effects of temperature. The required temperatures usually range from 160° to 220° C., preferably 165°–180° C. In case of very short-time temperature influences, however, it is also possible to utilize up to 300° C. Thus, especially smooth surfaces of the foamed components are attained by a brief superficial melting optionally under pressure, at temperatures of 180–300° C., preferably 200–250° C.

(1b) A further possibility for the production of damping materials involves the addition of binders to the particles, optionally with heating. The voluminous polyvinyl chloride particles can be introduced into a mold together with up to 50% by weight, preferably 10–30% by weight, of the binder, and heated jointly in the mold. Suitable binders include the following substances: inorganic adhesives, such as sodium silicate; organic adhesives, such as described, for example, in "Ullmanns Encyklopädie der technischen Chemie" [Ullmann's Encyclopedia of Technical Chemistry] 4th ed., vol. 14, pp. 228–260; whose disclosure is incorporated by reference herein; oligomeric and polymeric hot-melt adhesives, such as copolyamide hot-melt adhesives and polyester amide hot-melt adhesives (see "Adhesion" 1, pp. 7–14 [1969]; ibid. 12, pp. 485–487; "Adhesion Ages" 15 [1972]: 39–41, whose disclosure is incorporated by reference herein) or also polyetherester amides, curable polymers, e.g. unsaturated polyesters, or curable polyurethans, frothed (pre-foamed), expandable polystyrene particles, or foamable polyurethane copolymers.

The structure and density of the binders should be maximally similar to those of the damping material to ensure good miscibility. Optionally the addition of dispersants, e.g. expanded silica gel, talc, chalk, polytetrafluoroethylene can be advantageous to prevent agglomeration of the binder.

(2) It is also possible to manufacture multiple-layer panels. These are obtained, for example, by laminating the surface of foamed components with an aluminum foil, with plastic films of PVC, polyolefin, etc., with glass fiber fabrics, or with layered cellulose materials. It is likewise within the scope of this invention to use a combination with other foam materials, for example made of polystyrene or polyurethane, and a combination with panels of a synthetic resin or of wood, provided at least one layer of such a panel consists of more than 50% by weight of the voluminous PVC particles.

(3) Another possibility for producing the damping materials consists in enclosing the loose PVC material on all sides by films, textile panels, synthetic resin panels, or fine-meshed net or fabric sections. Examples of such damping materials are cushions, quilted covers, or multiple-layer, welded (heat-sealed) lengths of sheet material, hollow articles filled with loose PVC foam, etc.

The damping materials can contain structure-reinforcing additives, such as fibers or voluminous fillers. Examples of fibers include glass, mineral, metallic, asbestos, or viscose fibers. Suitable fillers include "Aerosil", bloated clay, perlites, aluminum silicates, and bloated slag or glasses.

The density of the damping materials is 20–200 g/l, preferably 40–100 g/l.

The resultant damping materials exhibit the following advantages:

1. Low heat conductivity with good water vapor diffusion, e.g., thermal conductivities R of the PVC particles of 0.035 to 0.045 w/mK.

2. Good noise-damping effects due to the open-cell structure.

3. Self-extinguishing properties: no dripping of flaming particles, in part, temporally limited flame resistance due to charring.

4. Chemical resistance against acids, alkalis, and many solvents.

Herein, heat conductivities were measured by means of the "Anacon" device model 88, at a temperature difference of 28° C.

To test flame retardance, a foam panel having a thickness of 3 cm (area 20×20 cm) was clamped in place horizontally. The pilot flame of a Bunsen burner (height of flame 3 cm, burner distance 1.5 cm) was directed onto the center of the panel, and the time required for the flame to penetrate the surface of the test specimen was measured by a stop watch.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples(s), all temperatures are set forth uncorrected in degrees Celsius; unless otherwise indicated, all parts and percentages are by weight.

The following examples are set forth for the production of the voluminous polyvinyl chloride particles:

EXAMPLE 1

(A) Production of Polyvinyl Chloride:

In a pressurized autoclave, 2,700 parts of vinyl chloride is polymerized in the presence of 4,650 parts of water, 0.2 part of a cellulose ether, 0.11 part of a partial ester of a polyol, and 0.2 part of dilauroyl peroxide at 55° C. and under a pressure of 8 atm. gauge under agitation for 8 hours. The autoclave is expanded to normal pressure and evacuated for 30 minutes to 150 torr. K-value: 70.

(B) In a 4-liter agitating vessel with dropping funnel and distillation bridge, 2 liters of ethylene glycol is heated to 150° C. At this temperature, a solution of 50 g of polyvinyl chloride in 950 g of tetrahydrofuran (=5% solution) is added dropwise under agitation during the course of 2 hours. While tetrahydrofuran is distilled off and condensed, the polyvinyl chloride is separated in flaky form. It is filtered, washed with water and methanol, and dried in a vacuum drying cabinet at temperatures of up to 120° C. Ethylene glycol and tetrahydrofuran are reusable for additional tests.

Yield: 49 g of polyvinyl chloride; bulk density: 40 g/l. The largest PVC particles weigh 0.1–0.2 g. Weighing 50 average particles gave a weight of 300 mg, meaning an average particle weight of 6 mg.

EXAMPLE 2a

A 6-liter agitated flask with dropping funnel and distillation attachment is charged with 3 liters of glycol and 1 liter of water at 120° C. A solution of 50 g of PVC in 950 g of tetrahydrofuran is added dropwise under stirring. While the evaporated THF is collected in the distillation receiver, the PVC is separated in the form of fine flakes. After separation by way of a vacuum filter, washing with water, and drying in a hot-air furnace at 100° C., a voluminous, white material is obtained having a bulk density of 18 g/l. By grinding in a disk attrition mill (firm: Alpine, model 160 Z), the bulk density rises to 22 g/l. The weight of 100 particles is 0.2 mg, i.e. the particles weigh 0.002 mg on the average.

EXAMPLE 2b

In accordance with Example 1, a solution of 50 g of polyvinyl chloride in 720 g of tetrahydrofuran and 230 g of methylene chloride is precipitated in 2 liters of ethylene glycol at 140° C. The product is worked up analogously to Example 1. Bulk density: 31 g/l.

EXAMPLE 3

One kilogram of a 15% solution of polyvinyl chloride in tetrahydrofuran is sprayed, with the aid of a reciprocating pump via metal conduits under a pressure of 5 bar through a 0.2 mm nozzle into a batch of 2 liters of ethylene glycol (having a temperature of 160° C.). The glycol is contained in a 4-liter agitated flask with attached distillation bridge and distillation receiver to collect the tetrahydrofuran removed by distillation. After cooling, the mixture is filtered through a fine-mesh screen and washed with water. After drying, 146 g of precipitated polyvinyl chloride is obtained having a bulk density of 36 g/l.

EXAMPLE 4

One liter of a 5% solution of polyvinyl chloride in tetrahydrofuran is metered under a pressure of 3 bar into an agitated batch of glycol heated to 135° C. through a 0.1 mm nozzle in the form of a fine jet. The product is worked up as in the preceding examples, yielding a fine-fibrous material with a bulk density of 22 g/l.

EXAMPLE 5

A 10% solution of post-chlorinated polyvinyl chloride (chloride content: 65%) in tetrahydrofuran is dripped into ethylene glycol in an apparatus corresponding to Example 1, at 120° C., 140° C., and 160° C. After separation, washing, and drying, the following bulk densities are obtained:

| Temperature of glycol: | 120° C. | Bulk Density: | 87 g/l |
|---|---|---|---|
| | 140° C. | | 83 g/l |
| | 160° C. | | 120 g/l |

EXAMPLE 6

1,000 g of a 5% tetrahydrofuran solution of a copolymer of vinyl chloride/vinyl acetate (95/5) is precipitated in glycol at 130° C. in accordance with Example 1. After separation, washing, and drying, 48.5 g of a flaky, elastic material is obtained. Bulk density: 29 g/l.

Examples 7–15 demonstrate various methods for the production of damping materials; Example 16 contains several test results.

EXAMPLE 7

A perforated metal mold having the internal dimensions of 20×20×3 cm is filled with 65 g of a flaky polyvinyl chloride precipitation product (bulk density about 18 g/l, as per Example 2a). The mold is brought to 165°–170° C. in a hot-air furnace during a period of 90 minutes with repeated turning. An open-cell, coherent foamed panel is thus produced. Shrinkage is about 10%; density of the panel is 60 g/l.

By short-term pressure contact with a metal plate heated to 220° C. (for example in a synthetic resin molding press), a solid, completely smooth surface of the foamed article is obtained.

EXAMPLE 8

In correspondence with Example 7, the metal mold is filled with voluminous polyvinyl chloride flakes. The mold is introduced into an autoclave preheated to 160° C. and exposed to superheated steam (220° C./20 bar) for a few seconds. After cooling, a solid, porous PVC panel is obtained having a density of 64 g/l, i.e. shrinkage is about 17%.

EXAMPLE 9

Voluminous polyvinyl chloride precipitation product (according to Example 1, bulk density 40 g/l) is ground in a mill ("Alpine" model Z 160) into a finely divided material having a powder density of 70 g/l. This material is thoroughly mixed
(a) with 10% by weight and
(b) with 30% by weight of a pulverulent hot-melt adhesive based on polyamide (mp 133° C.)

and then filled into the metal mold (20×20×3 cm). The mold is heated for 1 hour at 145° C.

The foamed panels have densities, after removal from the mold, of
(a) 90 g/l and
(b) 120 g/l.

EXAMPLE 10

(a) Ground PVC precipitation product (powder density 22 g/l, according to Example 2a) is thoroughly blended with 10% by weight of a polyamide hot-melt adhesive (mp 95°–100° C.). A metal mold (20×20×3 cm) is plugged with 55 g of the mixture and the latter glued together for 1 hour at 115° C. The foam material, after removal from the mold, has a density of 48 g/l.

(b) A foam panel according to Example 10a is laminated on both sides with an aluminum foil and processed into a stable composite article by short-term compressing in a synthetic resin molding press to a dimension of 2.8 cm (10 seconds/220° C).

EXAMPLE 11

Frothed, expandable polystyrene particles (bulk density: 18 g/l) and voluminous polyvinyl chloride precipitation product (bulk density: about 40 g/l) are thoroughly mixed in a weight ratio of 1:2 and filled into the metal mold (20×20×3 cm). By the introduction of steam under pressure (115° C./1 bar excess pressure/1 minute), the EPS foam is welded together so that a coherent test specimen is obtained having a density of 36 g/l.

EXAMPLE 12

100 g of an unsaturated polyester is blended with 2 g of a cobalt accelerator and then with 100 g of the loose PVC material (bulk density: 60 g/l). Another 100 g of the unsaturated polyester is blended with 4 g of methyl ethyl ketone peroxide and likewise with 100 g of PVC foam. The wetted PVC particles from these two premixes are well intermixed, filled into a metal mold, and cured in a heating cabinet at 50° C.

EXAMPLE 13

The PVC precipitation material (bulk density 40 g/l) is thoroughly wetted with a 10% sodium silicate solution, then filled into a metal mold, and dried at 120° C./20 mbar. The result is a brittle foam materal having a density of 90 g/l.

EXAMPLE 14

A fibrous PVC precipitation product having a bulk density of 22 g/l is welded in place between two synthetic resin sheets to form a cushion (pad) having an average thickness of 3 cm (surface area 20×20 cm).

EXAMPLE 15

A quilted cover having quilting seams at spacings of 10 cm, an area of about 2 m², and a thickness of about 5 cm is made from two thin, closely woven textile panels. The filling material employed is a fine-fibrous PVC material (bulk density 18 g/l). Such a quilt has a pleasantly soft handle and a good heat insulation. The filling material is self-extinguishing; the weight is about 2 kg.

EXAMPLE 16

TEST RESULTS:

| Specimen of Example No. | Specimen Material | Density (g/l) | Heat Conductivity (W/K m) | Burn-Through Time (sec) |
| --- | --- | --- | --- | --- |
| 7 | Lightweight PVC Material | 60 | 0.036 | 22 |
| 8 | Lightweight PVC Material | 64 | 0.036 | 24 |
| 9 | (a) PVC, Polyamide (9:1) | 90 | 0.041 | 81 |
|  | (b) PVC, Polyamide (7:3) | 120 | 0.043 | 64 |
| 10 | (a) PVC, Polyamide (9:1) | 48 | 0.035 | 20 |
|  | (b) PVC, Polyamide, Aluminum Foil | 55 | 0.035 | >120 |
| 11 | PVC, Expanded Polystyrene (2:1) | 38 | 0.035 | 10 |
| 12 | PVC, UP Resin (1:1) | 200 | 0.044 | 110 |
| 13 | PVC, Sodium Silicate | 80 | 0.049 | 41 |
| 14 | PVC, Sheet Stock Cushion | 22 | 0.037 | — |
| For Comparison | Flameproofed Expanded Polystyrene | 18 | 0.035 | 4 |

The heat conductivity of the polyvinyl chloride specimens is comparable to that of expanded polystyrene; however, the fire resistance is substantially higher.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an open-cell structure insulation material comprising a component effective for insulating, the improvement wherein the effective component comprises voluminous PVC particles having a particle weight less than 1 g and a bulk density of 10–80 g/l, whereby the insulation material is fire-retardant.

2. An insulation material of claim 1, wherein the voluminous PVC particles have a particle weight less than 0.1 g and a bulk density of 20–80 g/l.

3. An insulation material of claim 1 or 2 wherein the voluminous PVC particles are prepared by a process comprising adding a solution of polyvinyl chloride in a solvent to a heated, agitated nonsolvent for PVC, while removing the solvent by distillation, thereby precipitating PVC particles; the nonsolvent having a boiling point of <100° C. under normal pressure and the temperature of the nonsolvent lying 40°–120° C. above the boiling point of the solvent, but not falling below 100° C. nor exceeding 180° C.

4. An insulation material of claim 1 wherein the voluminous polyvinyl chloride particles are present in a form in which they are:

(a) combined into a lightweight component by the action of heat or the addition of a binder; or (b) enveloped with sheet stock or textile casing material.

5. An insulation material of claim 4 wherein the voluminous PVC particles are present in a form in which they are bonded into a foam material, having been so bonded by heating at a temperature of 160°-220° C.

6. An insulation material of claim 5 wherein the voluminous PVC particles were bonded into a foam material at a temperature of 160°-220° C. under the action of steam.

7. An insulation material of claim 4 wherein voluminous PVC particles are present in a form in which they are bonded into a foam material, having been so bonded in combination with an adhesive or binder.

8. An insulation material of claim 7 wherein the voluminous PVC particles were bonded into a foam material with a polymeric hot-melt adhesive at a temperature of 100°-160° C.

9. An insulation material of claim 7 wherein an expandable polymer was utilized as the binder for the voluminous PVC particles.

10. An insulation material of claim 4 wherein the voluminous PVC particles are present in loose form enveloped by a film or a textile fabric.

11. In a method of insulating a space volume from chemical or physical influences from outside the space volume comprising interposing a damping material between the space volume and the region outside the space volume, the improvement wherein the damping material is an insulation material of claim 1, 2, or 3.

12. In an insulated space volume comprising a boundary defining the space volume and insulation material interposed at the boundary, between the space volume and the region outside it, the improvement wherein the insulation material is a material of claim 1.

* * * * *